United States Patent [19]

Steine et al.

[11] Patent Number: 5,066,523

[45] Date of Patent: * Nov. 19, 1991

[54] PROCESS FOR PRODUCING CORROSION-RESISTANT LAYERS

[75] Inventors: Hans-Theo Steine; Christopher Wasserman, both of Lausanne, Switzerland

[73] Assignee: Castolin S.A., Sulpice, Switzerland

[ * ] Notice: The portion of the term of this patent subsequent to Sep. 4, 2007 has been disclaimed.

[21] Appl. No.: 476,242

[22] Filed: Feb. 7, 1990

Related U.S. Application Data

[63] Continuation of Ser. No. 213,790, Jun. 30. 1988, abandoned.

[30] Foreign Application Priority Data

Jul. 8, 1987 [DE] Fed. Rep. of Germany ....... 3722533

[51] Int. Cl.$^5$ .............................................. B05D 1/10

[52] U.S. Cl. ...................................... 427/423; 427/34; 75/255

[58] Field of Search ..................... 75/255; 427/34, 423

[56] References Cited

U.S. PATENT DOCUMENTS

| | | | |
|---|---|---|---|
| 4,348,433 | 9/1982 | Kammer et al. | 427/423 |
| 4,361,604 | 11/1982 | Kushner et al. | 75/251 X |
| 4,935,266 | 6/1990 | Steine et al. | 427/423 |

*Primary Examiner*—Evan Lawrence
*Attorney, Agent, or Firm*—Bachman & LaPointe

[57] ABSTRACT

A process for producing a protective metal layer on tubes used in firing installations comprises thermal spraying on the tubes an atomized powder being formed from an alloy which comprises from about 15 to 35% Cr, from about 0.05 to 5.0% Mn, from about 0.01 to 3.0% C, from about 0.1 to 3.0% Si, from about 0.1 to 8.0% Mo, from about 2.0 to 15.0% Al, and balance Fe.

3 Claims, 2 Drawing Sheets

PROCESS FOR PRODUCING CORROSION-RESISTANT LAYERS

This is a continuation of application Ser. No. 213,790 filed June 30, 1988, abandoned.

The invention relates to a process for the production of protective layers on tubes for preheaters and economisers in large-scale firing installations, which are used at a temperature below 400° C. That process and materials which are suitable therefor are to be used for increasing the service life of used tubes or for preventative purposes on new tubes.

In large-scale firing installations, for example in thermal power stations, garbage incinerator installations or the like, the tube nests of the preheaters and economisers suffer from more or less severe corrosive attack and a high level of erosion wear, due to flue gases. Erosion wear arises due to the high proportions of fly ash which is primarily composed of $Al_2O_3$, $SiO_2$, $Fe_2O_3$ and CaO.

Having regard to the high rate of wear, the operators of such installations are forced to replace tubes used therein by new tubes, in a given cycle. In order to reduce those relatively high costs and the stoppage times, attempts have already been made to protect the tubes by half-shell portions consisting of steel, which are secured to the side which is exposed to attack, by screwing or welding.

Tests for directly coating the tubes with alloys have remained unsuccessful as the alloys used were not resistant to erosion and peeled off.

Having regard to those facts the inventor set himself the aim of increasing the service lives of tubes or other parts which are subject to attack in such boiler installations or the like, by improving the resistance to corrosion and the resistance to erosion in relation to attacks by flue gases.

In seeking for a solution, it was surprisingly found that thermally sprayed layers, using powder materials of aspherical form, based on Ni, Fe and/or Co-alloys which contain the elements Cr and/or Mo in the range of from 0% to 35% Cr and/or 0% to 25% Mo and which have a proportion of Al and/or Ti, give good results in regard to service lives; the materials afford a higher level of absorption of energy of the particle when the flame passes. Application of the material, of a preferred grain distribution of between 37 μ/m and 150 μm, is advantageously effected with an autogenous flame spray apparatus or a plasma spray apparatus.

In accordance with a further feature of the invention the material comprises an Fe-base alloy with the following components:
Cr 15% to 35%, preferably 15% to 30%,
Mn 0.05% to 5%, preferably 0.05% to 2%,
C 0.01% to 3%, preferably 0.1% to 2%,
Si 0.1% to 3%, preferably 0.2% to 2%,
Mo 0.1% to 8%, preferably 0.5% to 5%,
Al 2% to 15%, preferably 3% to 13%,
balance iron.

A particularly advantageous Ni-base alloy is distinguished by the following constituents:
Cr below 26%, preferably 0% to 15%
C below 0.5%, preferably below 0.3%,
Mo 2% to 25%,
Al below 16%, preferably 0.1% to 13%,
Si 0.1% to 3%, preferably 0.2% to 3%,
Fe below 31%, preferably 5% to 25%,
W below 7%,
Ti 0% to 15%,
balance nickel.

Further Ni-base compositions according to the invention are as follows:
Cr 5% to 15%
C below 0.3%, preferably below 0.2%,
Mo 2% to 10%, preferably 3% to 8%,
Al 5% to 15%, preferably 8% to 12%,
Si 0.1% to 1.5%, preferably 0.2% to 1%,
Fe 5% to 15%, preferably 5% to 10%,
balance nickel,
or
C<0.3%, preferably below 0.2%,
Mo 10% to 25%, preferably 15% to 24%,
Si 0.5% to 3%, preferably 1% to 2.5%,
Fe 10% to 25%, preferably 15% to 24%,
W 0% to 6%, preferably 2% to 6%,
Ti 5% to 15%, preferably 8% to 15%,
balance nickel.

Further advantages, features and details of the invention will be apparent from the following description of a preferred embodiment and with reference to the drawing in which.

Figure 1:
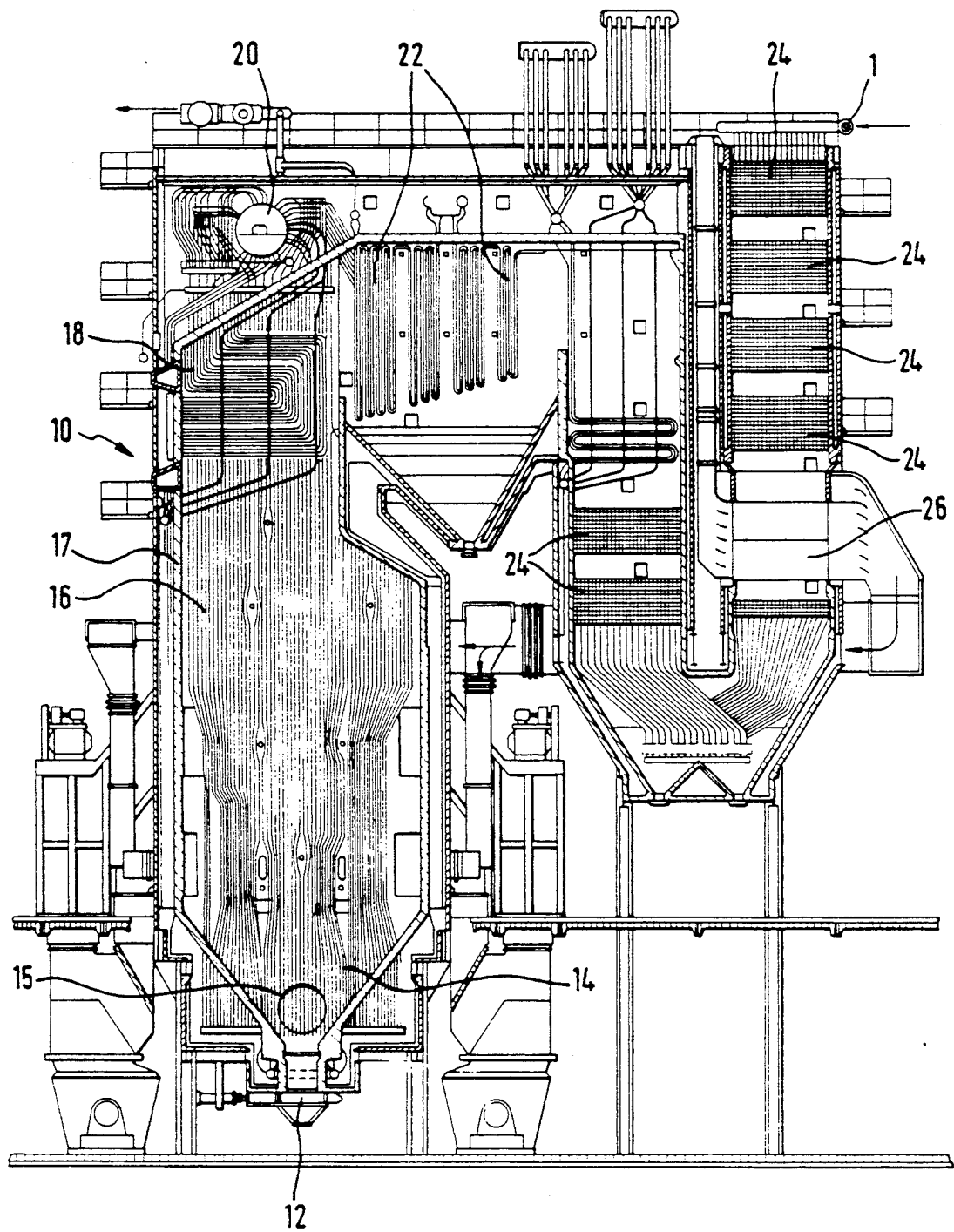
FIG. 1 is a view in cross-section of a vertical-tube boiler.

A vertical-tube boiler 10 for coal firing comprises, above an ash removal device 12, a combustion chamber 14 with burner 15 and a plurality of water tubes 16 at the boiler walls 17. Reference numeral 18 denotes platen superheaters below a boiler drum 20, reference numeral 22 denotes contact superheaters 24, and reference numeral 24 denotes feed water preheaters or economisers. Air preheaters 26 are arranged at the right-hand side of FIG. 1 between the feed water preheaters 24 in which the feed water is preheated with the exhaust gases from the boiler installation, saving on fuel and reducing the thermal stresses in the boiler. In the superheaters 18 and 22 saturated steam is raised to a higher temperature without an increase in pressure, that is to say it is superheated.

Figure 2:
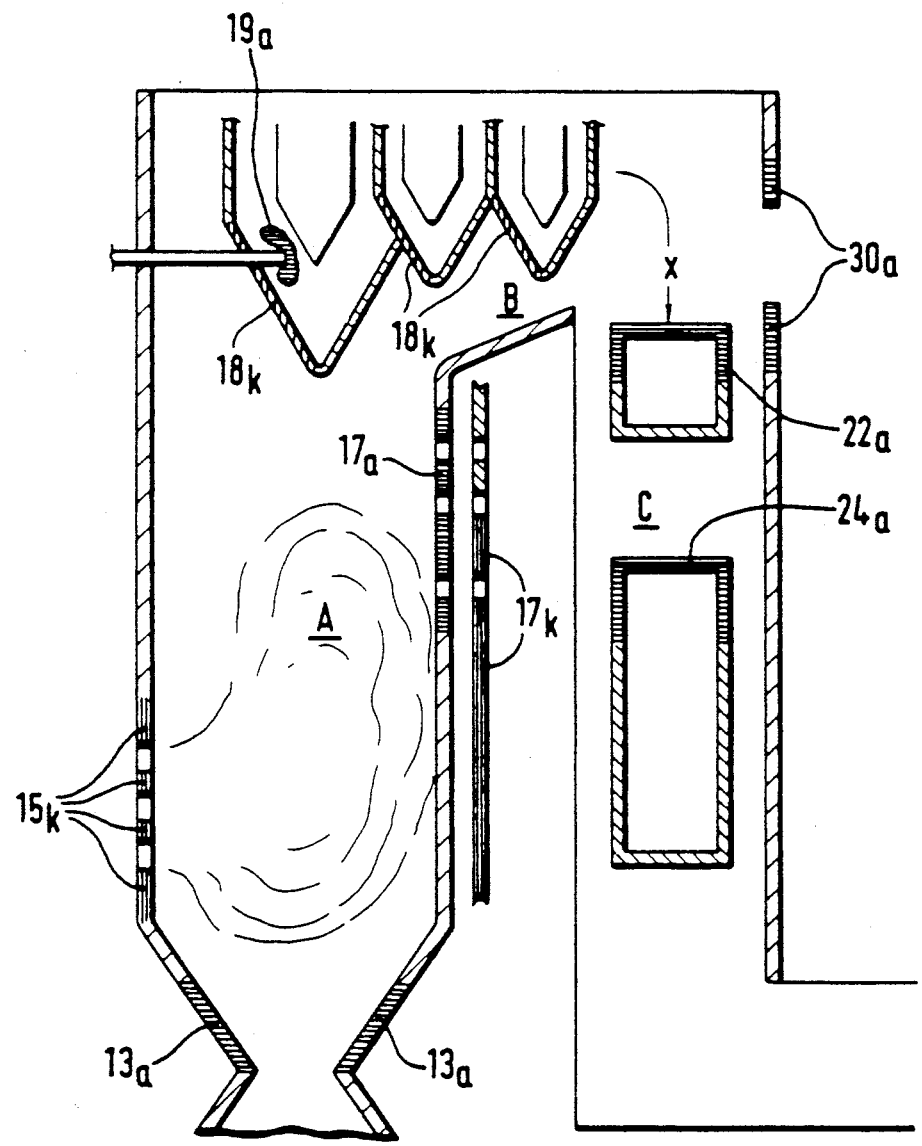
FIG. 2 is a diagrammatic view of the vertical-tube boiler.

FIG. 2 shows typical loading zones in respect of corrosion (index k) and erosion (index a). Corrosion phenomena occur primarily at the burner $15_k$, at the boiler wall $17_k$ and at the platen superheaters $18_k$ whereas erosion phenomena occur below the firing chamber 14 at $13_a$, at the boiler wall at $17_a$, at the soot blower $19_a$ of the platen superheater 18, at the contact superheaters $22_a$ which are the first in the direction of flow as indicated by x, and at the preheater $24_a$. In addition erosion occurs at an upper access opening $30_a$.

The temperatures in the firing chamber which are subject to corrosion and oxidation loadings are approximately between 1000° and 1200° C. (zone A), in zone B they are about 700° C. and in the region of the preheaters 24 and 26 they are about 400° C. (zone C).

The power materials in accordance with the invention are applied by thermal spraying to tubes of the preheaters 26.

Some embodiments with essential features of the invention are described hereinafter.

EXAMPLE 1

A half-shell portion (not shown) comprising steel, which was applied as a means for affording protection from wear on a tube of a preheater operating at 350° C. in a coal-fired power station had to be removed after a service life of six months due to a high rate of erosion wear. After removal of the half-shell portion, the surface of the tube was prepared on the side exposed to the wear, in situ, that is to say without being removed, by blasting with corundum, and it was then coated with an alloy which comprises an Fe-base alloy with Cr 15% to 30%, Mn 0.05% to 2%, C 0.1% to 2%, Si 0.2% to 2%, Mo 0.5% to 5%, Al 3% to 13% and the balance Fe, to a thickness of 0.6 mm, by autogenous flame spraying with a spray distance of 150 cm.

After a further service time, the coated tube was examined and it was found that the layer was still 0.4 mm in thickness. The half-shell portion of steel which was applied to the adjoining tube at the same time exhibited an amount of wear of 0.6 mm, that is to say the layer applied by spraying had substantially better resistance to wear than the half-shell portion, whereby the service life for the coated tube, until the next coating operation, was increased by double.

EXAMPLE 2

Taking a further tube of the preheater described in Example 1, an alloy which comprises an Ni-base alloy with Cr 5% to 15%, C 0.3%, Mo 2% to 10%, Al 5% to 15%, Si 0.1% to 1.5%, Fe 5% to 15% and the balance Ni was also tested, with a layer of the same thickness and using the same procedure. With that alloy also, the service life found was improved three times, in comparison with the half-shell portion.

EXAMPLE 3

Using the same preheater as in Example 1, a further tube was tested made from an alloy which comprises an Ni-base alloy with C<0.2%, Mo 15% to 24%, Si 1% to 2.5%, Fe 15% to 24%, W 2% to 6%, Ti 8% to 15% and the balance Ni, under the same conditions and with the layer of the same thickness. The service life found in this case was improved four times; when it was checked.

What is claimed is:

1. A process for producing a protective metal layer on tubes used in firing installations comprising thermal spraying on the tubes an atomized powder being formed of an alloy consisting essentially of from about 15 to 35% Cr, from about 0.05 to 5.0% Mn, from about 0.01 to 3.0% C, from about 0.1 to 3.0% Si, from about 0.1 to 8.0% Mo, from about 2.0 to 15% Al, and balance Fe.

2. A process according to claim 1 wherein said alloy material consists essentially of from about 15 to 30% Cr, from about 0.05 to 2.0% Mn, from about 0.1 to 2.0% C, from about 0.2 to 2.0% Si, from about 0.5 to 5.0% Mo, from about 3.0 to 13.0% Al, and balance Fe.

3. A process according to claim 1 wherein the powder is characterized by an aspherical grain shape.

* * * * *